United States Patent Office 3,268,485
Patented August 23, 1966

3,268,485
POLYMERS OF 3-(2-HYDROXYALKYL)OXAZOLI-
DINONE ACRYLATES AND METHACRYLATES
Richard A. Hickner, Midland, and Robert D. Beckrow,
Bay City, Mich., assignors to The Dow Chemical Company, Midland, Mich., a corporation of Delaware
No Drawing. Filed May 1, 1963, Ser. No. 277,128
14 Claims. (Cl. 260—77.5)

The invention relates to homopolymers of 3-(2-hydroxyalkyl)oxazolidinone acrylates and homopolymers of 3-(2-hydroxyalkyl)oxazolidinone methacrylates. It also concerns copolymers of the aforesaid organic ester monomers with other polymerizable monomeric ethylenically unsaturated compounds.

These novel homopolymers and copolymers of 3-(2-hydroxyalkyl)oxazolidinone acrylate and the novel homopolymers and copolymers of 3-(2-hydroxyalkyl)oxazolidinone methacrylate of the present invention combine many of the useful properties of polyacrylic esters and polymethacrylic esters with those of poly-N-vinyl-2-oxazolidinones.

It is well known that poly-N-vinyl-2-oxazolidinones function effectively as strong dye receptors and as complexing agents. However, the water solubility of those polymers disadvantageously causes them to lack dye-retaining stability or wash fastness. Heretofore, in order to provide water insolubility to those poly-N-vinyl-2-oxazolidinones, it was necessary to prepare copolymers of N-vinyl-2-oxazolidinone monomers with certain other polymerizable hydrophobic monomers. Those resultant copolymers have had a tendency to exhibit substantially lower and inadequate dye-receptivity characteristics. A further disadvantage of most copolymers composed of N-vinyl-2-oxazolidinone monomers and other polymerizable hydrophobic monomers is that those copolymers have had a tendency to cause a severe decrease in the tensile strength property of polyvinylidene chloride-containing textile fibers. Another disadvantageous characteristic of the N-vinyl-2-oxazolidinone monomers employed to prepare those poly-N-vinyl-2-oxazolidinones is their undesirable sensitivity to pH. As a result, N-vinyl-2-oxazolidinones cannot be effectively polymerized at a pH value below 7 due to the rapid hydrolysis undergone by such N-vinyl-2-oxazolidinone compounds to form acetaldehyde and the corresponding parent oxazolidinone compound.

Accordingly, an object of the present invention is to provide a new series of homopolymers of 3-(2-hydroxyalkyl)oxazolidinone acrylates and related copolymers of the aforesaid acrylate ester monomers with certain other polymerizable ethylenically unsaturated monomers.

Another object of the invention is to provide a new series of homopolymers of 3-(2-hydroxyalkyl)oxazolidinone methacrylates and related copolymers of the aforesaid methacrylate ester monomers with certain other polymerizable ethylenically unsaturated monomers.

A further object of the invention is to provide such new homopolymeric and copolymeric materials, as described above, which are substantially insoluble in water.

Another object of the invention is to provide such new homopolymeric and copolymeric materials which have high dye-receptivity and adhesive properties and advantageously have the capacity to retain a wide variety of dyes through repeated launderings.

An additional object of the invention is to provide the aforementioned new homopolymeric and copolymeric materials, the polymerization of which is appreciably facilitated by the lack of sensitivity of these monomers under acidic pH reaction conditions.

A further object of the invention is the provision of new homopolymeric and copolymeric materials which are highly beneficial as dye-receptive additives for employment in the dying of polyvinylidene chloride-containing textile fibers and which do not affect an appreciable decrease of the tensile strength of such textile fibers.

Other objects of the invention will become apparent hereinafter to those skilled in the art from the description and examples which follow.

These and other objects are accomplished, in general, by preparing homopolymers of the 3-(2-hydroxyalkyl)-oxazolidinone acrylate monomer; homopolymers of the 3-(2-hydroxyalkyl)oxazolidinone methacrylate monomer; and copolymers composed of from about 5 to about 95 weight percent of copolymerizable 3-(2-hydroxyalkyl)oxazolidinone acrylate monomer or copolymerizable 3 - (2 - hydroxyalkyl)oxazolidinone methacrylate monomer and from about 95 to about 5 weight percent of at least one other of certain copolymerizable ethylenically unsaturated organic monomers as defined hereinafter.

The above-described new homopolymers and new copolymers of the present invention because of their superior dye-receptivity, desirable adhesive, water-solubility and other beneficial properties find utility in a wide diversity of applications. These novel homopolymeric and copolymeric materials may be used as thickening agents in the formulation of various organic resinous latex-based paints and as viscosity index improving additives having detergent action for incorporation in lubricating oils. Further, these novel homopolymeric and copolymeric materials are particularly useful in the treatment of leather, polyester fibers, polyamide fibers and polyacrylic fibers to improve the dyeability and dye retention thereof. In addition, these novel copolymeric materials of the present invention are valuable as adhesives for bonding glass to glass, metal to metal, and glass to metal. As adhesives, such novel copolymeric materials are especially useful in the manufacture of safety glass, since these copolymers have a refractive index substantially identical to that of glass. Also, the adhesive characteristics of the copolymers of the present invention make them suitable reagents for use in the treatment of various cellulosic fibers (e.g. cotton, linen, wood, paper, etc.) and synthetic textile fibers for the purpose of picking up and adhering suitable germicidal compositions to such fibers to provide the same with germicidal properties.

The 3-(2-hydroxyalkyl)oxazolidinone acrylate and methacrylate monomers which may be employed in the preparation of the novel homopolymers and copolymers of the present invention include those having the general Formula I:

wherein $R_1$ is selected from the group of substituent radi-

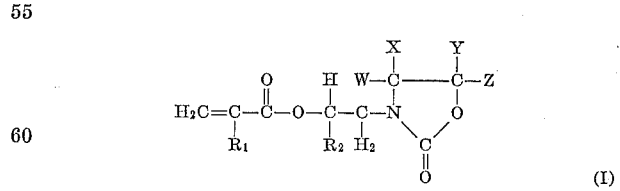

(I)

cals consisting of -hydrogen and -methyl; $R_2$ is selected from the group of substituent radicals consisting of -hydrogen, -methyl, -ethyl, and -phenyl; and W, X, Y, and Z, each taken independently, is selected from the group of radical substituents consisting of -hydrogen, -methyl, -ethyl, and -phenyl.

However, preferred acrylate and methacrylate ester monomers falling within the scope of the present invention are those having the general Formula II:

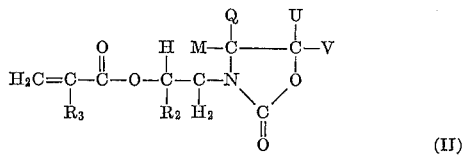

wherein R₃, taken independently, is selected from the group of substituent radicals consisting of -hydrogen, -methyl, and -ethyl; R₄ is selected from the group of substituent radicals consisting of -hydrogen, -methyl, and -ethyl; and M, Q, U, and V, each taken independently, is selected from the group of radical substituents consisting of -hydrogen, -methyl, and -ethyl.

Suitable 3-(2-hydroxyalkyl)oxazolidinone acrylate monomers falling within the scope of general Formula I, as shown heretofore, include 3-(2-hydroxyethyl)-5-ethyl-2-oxazolidinone acrylate;
3-(β-hydroxyphenethyl)-5-methyl-2-oxazolidinone acrylate;
3-(β-hydroxyphenethyl)-5-ethyl-2-oxazolidinone acrylate;
3-(2-hydroxypropyl)-5-phenyl-2-oxazolidinone acrylate;
3-(2-hydroxypropyl)-4-methyl-2-oxazolidinone acrylate;
3-(2-hydroxybutyl)-4-ethyl-2-oxazolidinone acrylate;
3-(2-hydroxybutyl)-4,5-dimethyl-2-oxazolidinone acrylate; and
3-(β-hydroxyphenethyl)-5-phenyl-2-oxazolidinone acrylate.

Also, 3-(2-hydroxyalkyl)oxazolidinone methacrylate monomers depicted by general Formula I that may be employed in the preparation of the new homopolymers and new copolymers of the present invention include 3-(2-hydroxyethyl)-5-ethyl-2-oxazolidinone methacrylate;
3-(β-hydroxyphenethyl)-5-methyl-2-oxazolidinone methacrylate;
3-(β-hydroxyphenethyl)-5-ethyl-2-oxazolidinone methacrylate;
3-(2-hydroxyethyl)-5-phenyl-2-oxazolidinone methacrylate;
3-(2-hydroxyethyl)-4-methyl-2-oxazolidinone methacrylate;
3-(2-hydroxyethyl)-4-ethyl-2-oxazolidinone methacrylate;
3-(2-hydroxyethyl)-4,5-dimethyl-2-oxazolidinone methacrylate;
3-(2-hydroxyethyl)-5-phenyl-2-oxazolidinone methacrylate;
3-(2-hydroxyethyl)-5,5-dimethyl-2-oxazolidinone methacrylate;
3-(β-phenethyl)-5-phenyl-2-oxazolidinone methacrylate; and the like.

Nevertheless, the particularly useful acrylate and methacrylate ester monomers for producing the novel homopolymers and copolymers of the present invention are structurally identified by general Formula II, shown heretofore and species of this preferred group include 3-(2-hydroxyethyl)-5-methyl-2-oxazolidinone acrylate;
3-(2-hydroxyethyl)-5-methyl-2-oxazolidinone methacrylate;
3-(2-hydroxyethyl)-2-oxazolidinone methacrylate;
3-(2-hydroxypropyl)-5-methyl-2-oxazolidinone methacrylate; and
3-(2-hydroxypropyl)-5-methyl-2-oxazolidinone acrylate.

Polymerizable monomeric ethylenically unsaturated compounds within the scope include C₁–C₁₈ primary and secondary alkyl esters of acrylic acid, such as methyl acrylate, ethyl acrylate, propyl- and isopropyl acrylates, butyl-, isobutyl- and sec.-butyl acrylates, amyl- and isoamyl acrylates, hexyl acrylate, 2-ethylhexyl acrylate, lauryl acrylate, octyl acrylate, 3,5,5-trimethylhexyl acrylate, decyl acrylate, dodecyl acrylate, cetyl acrylate, octadecyl acrylate, octadecenyl acrylate and the like; and C₁–C₁₈ primary and secondary alkyl esters of methacrylic acid, such as methyl-, ethyl-, propyl-, isopropyl-, butyl-, isobutyl-, and sec.-butyl methacrylates, n-amyl methacrylate, sec.-amyl methacrylate, hexyl methacrylate, 2-ethylbutyl methacrylate, 2-ethylhexyl methacrylate, lauryl methacrylate, octyl methacrylate, 3,5,5-trimethylhexyl methacrylate, decyl methacrylate, dodecyl methacrylate, octadecyl methacrylate and the like; C₁–C₉ alkyl esters of crotonic acid, such as proyl crotonate, butyl crotonate, nonyl crotonate and the like. Further contemplated within the coverage may be α,β-ethylenically unsaturated carboxylic acids. This class of acids includes not only monocarboxylic acids but includes as well the polycarboxylic acids. The monocarboxylic acids used may include acrylic acid, methacrylic acid, crotonic acid and the like. The polycarboxylic acids employed may comprise maleic, fumaric, itaconic, citraconic, mesaconic, aconitic; and the related halogenated acids, such as halogenated maleic, chloromaleic and the like. Quite obviously, these acids may be used either singly or in combination with one another. Whenever available, anhydrides of such acids may be used either singly or in combination with one another or with the acids.

Also contemplated as useful comonomers may be acrylonitrile and methacrylonitrile; as well as acrylamide, methacrylamide, ethacrylamide, ethylenebisacrylamide, N-tert.-butylacrylamide and the like.

Various monoalkenyl aromatic hydrocarbons of the benzene series may be suitable comonomers for the presently intended purpose and such monomers are characterized by the general formula:

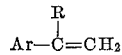

wherein Ar, selected independently, represents an aromatic hydrocarbon and a nuclear halohydrocarbon radical and R is hydrogen, a C₁–C₄ alkyl radical, or a halogen radical having an atomic number of from 17 to 35, including styrene, α-methylstyrene, o-methylstyrene, p-methylstyrene, m-methylstyrene, ar-ethylstyrene, propylstyrenes, butylstyrenes, ar-chlorostyrene, ar-bromostyrene and the like. Other monomeric ethylenically unsaturated compounds contemplated as comonomers for present purposes can be open-chain aliphatic conjugated dienes having from 4 to 9 carbon atoms, such as butadiene, isoprene and the like; as well as vinyl ester monomers including vinyl acetate, vinyl propionate, vinyl butyrate and the like; and vinylidene chloride.

Included among other monomeric polymerizable ethylenically unsaturated compounds suitable as comonomers in the preparation of the novel 3-(2-hydroxyalkyl)oxazolidinone acrylate-containing and related methacrylate-containing copolymers of the present invention are certain monomeric N-vinylalkyl-2-oxazolidinone compounds. Such compounds can be N-vinyl-4-methyl-2-oxazolidinone;
N-vinyl-5-ethyl-2-oxazolidinone;
N-vinyl-4-ethyl-2-oxazolidinone;
N-vinyl-4-propyl-2-oxazolidinone;
N-vinyl-5-phenyl-2-oxazolidinone;
N-vinyl-4-butyl-2-oxazolidinone;
N-vinyl-5-butyl-2-oxazolidinone; and particularly
N-vinyl-5-methyl-2-oxazolidinone.

Further, included as a desirable comonomeric material is N-vinyl-2-pyrrolidone and the like. Further, included among suitable polymerizable monomeric ethylenically unsaturated compounds employed for the above-described purpose is at least one polymerizable monomeric ethylenically unsaturated compound depicted by general Formula III:

$$H_2C=CG_2 \qquad (III)$$

wherein G is selected from the group of substituent radicals consisting of halogen having an atomic number of from 17 to 35 and cyano. Exemplary of the polymerizable monomeric ethylenically unsaturated compounds of general Formula III which likewise may be employed as desirable comonomers include vinylidene chloride, vinylidene bromine and vinylidene cyanide.

Notwithstanding the suitability of the foregoing polymerizable monomeric ethylenically unsaturated compounds as comonomers that can be satisfactorily employed in the preparation of 3-(2-hydroxyalkyl)oxazolidinone acrylate-containing or methacrylate-containing copolymers of the present invention, however, preferred comonomers for the intended purposes are butyl acrylate, vinyl acetate, N-vinyl-2-pyrrolidone, N-vinyl-5-methyl-2-oxazolidinone, acrylamide, lauryl methacrylate, hexyl methacrylate and vinylidene chloride. All of the foregoing operable and preferred species of monomers may be employed singly or in combination with others of the above-defined monomers to prepare the novel and highly utile copolymers of the invention.

The novel homopolymers of the present invention of 3-(2-hydroxyalkyl)oxazolidinone acrylate or 3-(2-hydroxyalkyl)oxazolidinone methacrylate and novel copolymers of the aforesaid esters with at least one other polymerizable ethylenically unsaturated monomer can be prepared by employing known methods for polymerizing the comonomers. Bulk, emulsion, suspension or solution methods may be used to affect polymerization of the monomer and/or monomer mixture. The monomer or mixture of monomers, in solution, emulsion, suspension or bulk, can be polymerized by the aid of heat and/or light in the presence or absence of polymerization catalyst at subatmospheric, atmospheric or superatmospheric pressure. Instead of using monomeric material, it is possible to start with partially polymerized materials or with a monomer mixture and other partially polymerized monomeric materials. Another method of producing the copolymeric materials of the invention is to mix the monomer mixture with a polymer, and bring about the further polymerization of the entire mass by the application of heat and/or light in the presence or absence of polymerization catalyst at subatmospheric, atmospheric or superatmospheric pressure. The resultant homopolymers and copolymers of the invention can be isolated by known methods, such as precipitation, evaporation of solvent, or flaking on drying rolls. The polymeric latexes prepared by means of emulsion polymerization techniques may may be employed per se or may be isolated, e.g. by coagulation with various inorganic salts.

When bulk or solution polymerization techniques are used to produce the new 3-(2-hydroxyalkyl)oxazolidinone acrylate and methacrylate polymeric materials of the invention, one or more polymerization promoting and sustaining catalysts can be suitably admixed with the monomer solution prior to or after introducing the solution of reactants into the polymerization reactor. Also, if solution polymerization methods are employed, in addition to a catalytic agent, it is customary to include as the reaction medium, one or more inert organic solvents which are known to be miscible not only with the reactants but likewise with the polymer. Frequently, the solvent reaction medium is also a suitable solvent for the reaction-formed polymeric product. Suitable inert organic solvents for present purposes may include various alkanols containing from 1 to 6 carbon atoms, toluene, xylene, benzene, water-alcohol mixtures or chlorinated aliphatic solvents and the like.

The range of polymerization temperatures to be employed in accordance with the four different polymerization techniques practiced herein to insure the production of a satisfactory polymer product in each instance is governed as to upper limit by the temperature at which the polymer depolymerization rate commences to exceed the polymer formation or polymerization rate. A satisfactory lower temperature limit is determined by determining the polymerization initiation and polymerization propagation temperatures required by the various monomer or monomers being polymerized.

Since certain changes may be made in the above polymerizable monomeric components, and since different embodiments of the invention could be made without departing from the scope thereof, it is intended that all matter contained in the above description shall be interpreted as illustrative only and not in a limiting sense. Thus, the term "monomer" implies a single monomer or a mixture of two or more monomers and the term "polymer" implies a homopolymer or a copolymer of two or more monomers.

An emulsifier is generally employed in emulsion and suspension polymerization practices preferably in an amount in the range of from about 0.01 to about 10.0 percent based on monomer weight and may be of the anionic, cationic or nonionic type. While it is desirable to have an anionic emulsifier, it is not detrimental if a small amount, i.e. up to 10 percent, of a nonionic emulsifier is present or added after polymerization is complete. Appropriate emulsifying agents for present purposes include aryl sulfonates, alkali metal alkyl sulfates, alkyl naphthalene sulfonates, n-octadecyldisodium sulfosuccinate, di-t-butylphenoxy(polyethylene oxide)$_{40}$, sodium octylphenoxy (polyethylene oxide)sulfonate, isoocetylphenyl polyethoxyethanol, nonylphenyl ether of nonaethylene glycol, sodium capryl phosphate, nonylphenyl ether of tetracontaethylene glycol, alkylphenyl polyethylene glycol ether, and particularly polyoxyethylene sorbitan monooleate, obtained as "Tween 81," a rosin ester of polyethylene glycol, obtained as "Synthetic AR–100" and dihexyl sodium sulfosuccinate, obtained as "Aerosol MA" and the like, etc. When greater than about 10 to 15 percent of the emulsifier is employed, there is usually no proportional increase in benefits and the resulting latex may have such a propensity to foam as to detract from its utility as a coating composition. The optimum amount of emulsifier and specific type can easily be determined by someone familiar with the field.

Suitable catalysts can be the peroxides, e.g. benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-t-butyl peroxide, t-butyl hydroperoxide, tetralin peroxide, 1-hydroxycyclohexyl hydroperoxide-1, urea peroxide, etc., certain sulfates, e.g. ferrous sulfate, etc., the percompounds, e.g. ammonium persulfate, sodium perchlorate, sodium perborate, potassium persulfate, etc., ozone, ozonides, etc., azo compounds, e.g. azobisisobutyronitrile, azodiisobutyramide, dimethyl or diethyl or dibutyl azodiisobutyrate, and the like. Azobisisobutyronitrile, t-butylhydroperoxide and ammonium persulfate are preferred catalysts. The catalysts may be used alone or in admixture with one another. Any suitable amount of the catalyst or catalyst mixture may be used, but in general, the catalyst concentration that gives satisfactory results may be within the range of 0.01 to 1 percent by weight of the entire polymerizable mass. When azo type catalysts are used, it is advisable to add the monomer or mixture of monomers dropwise into the reaction. Such a procedure is preferable when more than a few hundred grams of monomer is used. The above-described dropwise procedure is particularly advantageous in the preparation of the 3-(2-hydroxyalkyl) oxazolidinone acrylate and methacrylate-containing copolymers of the present invention. The formation of the homopolymers of the invention appears to be less exothermic and, accordingly, the procedure for introducing the monomer charge into the polymerization reaction may be handled by other procedures known in the art.

The action of the catalysts may be enhanced by the use of suitable promoters or activators. A catalyst-promoter system can enable the polymerization to proceed at room temperature and bring about the polymerization of the entire mass in a much shorter time. A number of nitrogeneous compounds, e.g. amines, especially aromatic and aliphatic tertiary amines, azo compounds, etc.; aromatic sulfinic acids, certain sulfites like sodium metabisulfite, dibutyl sulfite, etc.; long-chain aliphatic mercaptans, e.g. dodecyl mercaptan, etc. are capable of promoting the action of catalysts like peroxides, percompounds like persulfates, etc. and bring about the polymerization at room temperature. The time required for such a polymerization will depend on the nature and amounts of the catalyst and promoter employed. In polymerizations of this type, it may be desirable to employ polymer or copolymer along with monomer mixture. Polymerization conditions may further be modified by the application of heat, light or heat and light, cooling at atmospheric, subatmospheric and superatmospheric pressure.

In general, acrylic and methacrylic ester monomers employed in the homopolymers and copolymers of the present invention are soluble in water, aromatic hydrocarbons, alcohols, or ketones.

In each of a series of experiments, an oxyalkyleneoxazolidinone and an acylating agent (e.g. acrylic acid, methacrylic acid or methacryloyl chloride) were mixed and reacted, catalytic amounts of a strong acid, such as sulfuric acid, being added when the acylating agent was an alkenoic acid; from 1 to 5 milliliters of concentrated sulfuric acid were sufficient in every instance. The mixture was heated to about the reflux temperature and maintained thereat for 4–6 hours. The reaction mixture was neutralized, when necessary, with anhydrous ammonia, and the oxyalkyleneoxazolidinone ester removed from the reaction mixture by distillation. The quantity of reactants employed varied from 0.2 mole to 3.0 gram moles throughout the series of experiments and the reactants were employed in approximately their stoichiometric ratios. There are shown in Table I the reactants employed, the esters prepared and the yields based on the amount of acylating agent used, the boiling points or melting points and the refractive indices of the ester monomer products, and other pertinent properties.

TABLE I

| Preparation | 2-Oxazolidinone | Acylating Agent | Ester | Yield, percent | B.P., ° C. | $N_D^{25}$ |
|---|---|---|---|---|---|---|
| A | 3-(2-hydroxyethyl)- | Acrylic Acid | Acrylate | 70 | 140–145 at 0.4 mm | 1.4803 |
| B | do | Methacrylic Acid | Methacrylate | 63 | 147–150 at 0.5 mm | 1.4810 |
| C | 3-(2-hydroxyethyl)-5-methyl- | Acrylic Acid | Acrylate | 50 | 141–145 at 0.3 mm | 1.4735 |
| D | do | Methacrylic Acid | Methacrylate | 48 | 148–151 at 1 mm | 1.5720 |
| E | 3-(2-hydroxypropyl)-5-methyl- | Acrylic Acid | Acrylate | 67 | 140–143 at 0.1 mm | 1.4682 |
| F | do | Methacryloyl Chloride | Methacrylate | 70 | 110–120 at 0.1–0.2 mm | 1.4688 |

The above-described polymerizable 3-(2-hydroxyalkyl) oxazolidinone acrylate and methacrylate monomers are conveniently prepared by contacting an oxyalkyleneoxazolidinone with a suitable alkenoic acid having from 3 to 4 carbon atoms under acylating conditions. Complete details of the method of preparation of similar ester compounds are set forth in copending application for U.S. Letters Patent filed February 15, 1963, by R. A. Hickner and bearing the U.S. Serial No. 173,350. In one convenient method, the reactants and catalyst, if any, are mixed and the mixture heated at an elevated temperature for a period of time sufficient to cause substantially complete esterification; normally, heating at the reflux temperature for 4–6 hours is sufficient to complete the reaction. The water produced in the reaction, if any, is suitably removed as an azeotrope with an inert solvent which forms an azeotrope with water. Neutralization of the reaction mixture, when necessary, is suitably effected by an alkaline material, such as, for example, anhydrous ammonia or a basic ion-exchange resin. The desired product may then be purified by distillation, if desired.

The above-mentioned acylating agent employed as a reactant is selected from the group of acyl chlorides, such as methacryloyl chloride, and monoethylenically unsaturated monomcarboxylic acids, such as acrylic acid and methacrylic acid, said acylating agent having 1 carboxyl group and optionally containing a chlorine or a bromine substituent.

The acid catalyst optionally employed, if any, may be one chosen from a group of known strong acids. Sulfuric acid, hydrochloric acid, toluene sulfonic acid and strong acid ion-exchange resins are examples of operable strong acids.

The solvent used in the reaction mixture, if any, may be any suitable inert solvent preferably one that forms an azeotrope with water. Examples of suitable solvents are benzene, toluene, and perchloroethylene.

The ratio of the aforesaid alkenoic acid to oxyalkyleneoxazolidinone will vary depending upon the boiling points of the reactants and reaction products.

The oxyalkyleneoxazolidinones employed as other polymerizable ethylenically unsaturated monomers for preparing the novel copolymers of the present invention are conveniently prepared by contacting a 2-oxazolidinone with an alkylene oxide selected from the group constsiting of ethylene oxide, propylene oxide and butylene oxides. Details of this method of preparation are likewise set forth in the previously identified copending patent application. Such a reaction, however, is suitably carried out at a temperature of 90°–180° C. and at a pressure of 2–10 atmospheres, preferably at 110°–145° C. and 3–5 atmospheres. Normally, 2 to 4 hours are required for completion of the reaction, after which any unreacted alkylene oxide is conveniently removed from the reaction vessel by reducing the pressure to subatmospheric. The 2-oxazolidinone product may then be purified by distillation, if desired.

The monomeric N - vinylalkyl - 2 - oxazolidinone compounds described earlier in the specification may be prepared by a method which involves the transvinylation of alkyl-substituted-2-oxazolidinones with an alkyl vinyl ether under the influence of certain catalysts, such as mercuric acetate. Details of the foregoing method of preparation are set forth in U.S. Letters Patent No. 2,919,279, issued December 29, 1959, to W. E. Walles, W. F. Tousignant, and Thomas Houtman, Jr.

The following Examples I–XIV are merely illustrative of the practices suitable for preparing the novel homopolymers of both 3-(2-hydroxyalkyl)oxazolidinone acrylate monomers and 3-(2-hydroxyalkyl)oxazolidinone methacrylate monomers as well as novel copolymers of the aforesaid acrylate and methacrylate ester monomers with certain other polymerizable ethylenically unsaturated monomers, and are not to be construed as limiting the scope of the invention.

*Example I*

All polymerization reactions described hereinafter were carried out in a suitable reaction flask fitted with a stirrer, condenser, thermometer, and nitrogen sparge. The flask was swept with nitrogen for several minutes and the polymerization began while nitrogen was bubbled through the solution slowly. Whether indicated or not, the grade of methanol used hereinafter in all of the examples was American Chemical Society standard grade designated as A.C.S. methanol.

A solution of 50 grams of the acrylate ester of 3-(2-hydroxyethyl)-5-methyl-2-oxazolidinone, 100 milliliters of A.C.S. methanol, 100 milliliters of distilled water, and 0.5 grams of α,α'-azobisisobutyronitrile was gradually heated with stirring to 70° C. under a stream of nitrogen. Subsequently, the mixture was heated at 70° C. for 5 hours. The mixture had separated into two phases. Sufficient methanol was added until a homogeneous solution formed and the polymer was then precipitated by pouring the solution into isopropyl alcohol. The wet polymer product was elastomeric. The dried polymer product was a hard material and weighed 32 grams (a 64 percent yield).

*Example II*

A solution of 50 grams of the methacrylate ester of 3-(2-hydroxyethyl)-5-methyl-2-oxazolidinone, 100 milliliters of A.C.S. methanol, 75 milliliters of water, and 0.5 gram of α,α'-azobisisobutyronitrile was heated with stirring to 70° C. under a stream of nitrogen. Thereafter, it was maintained under the aforesaid reaction conditions for 7.5 hours. Methanol was added until a homogeneous solution formed and the polymer was then precipitated by pouring the solution into isopropyl alcohol. The wet polymer was considerably harder and less elastic than the acrylate of Example I. When dried, the polymer weighed 45 grams (a yield of 90 percent).

*Example III*

A solution of 40 grams of the methacrylate ester of 3-(2-hydroxypropyl)-5-methyl-2-oxazolidinone, 100 milliliters of A.C.S. methanol, 50 milliliters of distilled water, and 0.5 gram of α,α'-azobisisobutyronitrile was gradually heated with stirring to 70° C. under a stream of nitrogen. Subsequently, the mixture was heated at 70° C. for 5 hours. Sufficient methanol was added until a homogeneous solution formed. The polymer was then precipitated by pouring the homogeneous solution into isopropyl alcohol. The resultant homopolymer of 3-(2-hydroxypropyl)-5-methyl-2-oxazolidinone methacrylate was soluble in ethyl alcohol, water and in acetone/water mixtures. The same solubility characteristics are exhibited by the homopolymer of 3-(2-hydroxyethyl)-5-methyl-2-oxazolidinone acrylate prepared in accordance with the procedures set forth in Example I and the homopolymer of 3-(2-hydroxyethyl)-5-methyl-2-oxazolidinone methacrylate prepared in accordance with the procedures set forth in Example II.

*Example IV*

A solution of 10 grams of the acrylate ester of Example I, 90 grams of N-vinyl-5-methyl-2-oxazolidinone, 100 milliliters of methanol, 100 milliliters of water, and 1.0 gram of above-employed azo catalyst was heated gradually to 63° C. The temperature continued to rise to 71° C. Thereafter, the solution was heated an additional 4 hours at 60° C. The viscous solution was diluted with 100 milliliters of methanol and 100 milliliters of water and the polymer was precipitated by pouring into isopropyl alcohol. It was collected by filtration and dried in a vacuum oven. The dry polymer weighed 74 grams, representing a yield of 74 percent. It was soluble in a 50/50 solvent blend of methanol and water, a 50/50 solvent blend of acetone and water, and methylene chloride.

*Example V*

A solution of 25 grams of the methacrylate ester of 3-(2-hydroxyethyl)-5-methyl-2-oxazolidinone, 75 grams of N-vinyl-5-methyl-2-oxazolidinone, 400 milliliters of 50 percent aqueous methanol solution, and 0.5 gram of α,α'-azobisisobutyronitrile catalyst was heated at 72° C. for 6 hours. The polymer which was isolated by flaking on a set of drying rolls weighed 82 grams (82 percent yield).

*Example VI*

A solution of 50 grams of N-vinyl-5-methyl-2-oxazolidinone, 50 grams of 3-(2-hydroxyethyl)-5-methyl-2-oxazolidinone acrylate, 500 milliliters of ethanol, 100 milliliters of distilled water, and 1 gram of the afore-described azo catalyst was slowly heated to 72° C. The reaction temperature rose spontaneously to 78° C. When the exothermic reaction had subsided, heating was continued for an additional 7.0 hours at 73° C. The copolymer product which was precipitated from isopropyl alcohol weighed 90.3 grams (a 90.3 percent yield).

*Example VII*

A solution of 25 grams of methacrylate ester of 3-(2-hydroxyethyl)-5-methyl-2-oxazolidinone, 75 grams of N-vinyl-5-methyl-2-oxazolidinone, 400 milliliters of 50 percent aqueous methanol solution, and 0.5 gram of α,α'-azobisisobutyronitrile catalyst was heated with stirring at 70° C. under a nitrogen purge for 6 hours. The polymer product in 82 percent yield was isolated by flaking on drying rolls.

*Example VIII*

A flask was charged with 50 grams of N-vinyl-2-pyrrolidone, 50 grams of the acrylate ester of Example I, 700 milliliters of ethanol, 100 milliliters of water, and 0.5 gram of the azo catalyst previously employed. The mixture was heated to 71° C. whereupon the reaction temperature continued to rise spontaneously to 78° C. It was allowed to cool somewhat and then stirred at 72° C. for a total reaction time of 5½ hours. The solvent was removed by distillation and the crude polymer was dissolved in methylene chloride. The copolymer which was precipitated by ether weighed 64 grams. A yield of 64 percent was obtained.

*Example IX*

A flask was charged with 80 grams of vinylidene chloride, 20 grams of the acrylate ester of 3-(2-hydroxyethyl)-5-methyl-2-oxazolidinone, 300 milliliters of distilled water, 2 milliliters of ethanol, 5 grams of a rosin ester of polyethylene glycol, obtained as "Synthetic AR-100," and 2 milliliters of 0.15 percent aqueous ferrous sulfate solution. Acetic acid was added to lower the pH to 4 followed by 2 grams of ammonium persulfate, 2 grams of sodium metabisulfite, and 5 drops of t-butylhydroperoxide. The temperature was maintained at 30° C. for 3 hours. The copolymer was obtained as a suspension which gradually settled.

*Example X*

A solution of 50 grams of vinyl acetate, 50 grams of the acrylic ester of Example IX, 500 milliliters of ethanol, 100 milliliters of water, and 2 grams of the same type of azo catalyst was heated at 72° C. for 6 hours. An additional one gram of catalyst was added after 1.5 hours. The solvent was flashed off and the copolymer dissolved in methylene chloride. It was precipitated by pouring into ether. The polymer melted to a clear, light brown resin at 140° F. It weighed 75 grams (75 percent).

*Example XI*

A suspension of 75 grams of N-vinyl-5-methyl-2-oxazolidinone, 25 grams of the acrylic ester of Example IX, 5 grams of dihexyl sodium sulfosuccinate, obtained as "Aerosol MA," one gram of the previously employed type of azo catalyst, and 100 milliliters of distilled water was heated to 67° C. The copolymer separated nearly immediately and attached itself to the stirrer. The mixture was heated for an additional 5 minutes. The copolymer at this stage was highly elastomeric. On drying, it became solid and weighed 95 grams (95 percent).

Example XII

A flask was charged with 80 grams of butyl acrylate, 20 grams of the acrylate ester of Example IX, 300 milliliters of distilled water, 2 grams of polyoxyethylene sorbitan monooleate, obtained as "Tween 81," and 2 milliliters of a 0.15 percent aqueous ferrous sulfate solution. The flask was cooled to 20° C. and one gram of sodium metabisulfite and 5 drops of t-butylhydroperoxide were added. A precipitate appeared after about one minute. The total reaction time was 15 minutes. The copolymer was filtered off and dried in a vacuum oven at 180° F. The light brown, rubbery copolymer weighed 87 grams, representing a yield of 87 percent. It was soluble in acetone and toluene.

Example XIII

A solution of 9 grams of the methacrylate ester of 3-(2-hydroxyethyl)-5-methyl-2-oxazolidinone, 39 grams of lauryl methacrylate, and 12 grams of hexylmethacrylate in 140 grams of benzene was heated with 0.6 gram of benzoyl peroxide at 80° C. for 16 hours. A solids content analysis indicated 95.6 percent yield of polymer. The benzene was removed at reduced pressure and the polymer dissolved in neutral oil [1] having a Saybolt universal viscosity of 100 at 100° F. to give a solution containing 30 percent polymer.

Example XIV

A solution of 10 grams of the acrylate of 3-(2-hydroxyethyl)-5-methyl-2-oxazolidinone, 690 grams of a 13 percent acrylamide solution in water, 0.1 gram of a concentrated aqueous solution of the technical grade of tetrasodium salt of ethylenediaminetetraacetic acid, 0.17 gram of t-butylhydroperoxide was gradually heated to 60° C. The temperature continued to rise spontaneously to 83° C. over a 15 minute period at which time the solution was extremely viscous. The reaction mixture was stirred for an additional 3 hours, with heating, as required, at 65° C. The clear polymer solution was so viscous it tended to climb up the stirrer.

The copolymers of the present invention composed of from about 50 to about 90 weight percent of copolymerized N-vinyl-5-methyl-2-oxazolidinone and from about 10 to about 50 weight percent of copolymerized 3-(2-hydroxyalkyl)oxazolidinone acrylate or copolymerized 3-(2-hydroxyalkyl)oxazolidinone methacrylate are insoluble in 2B absolute alcohol (i.e. a denatured alcohol formulation containing 0.5 gallon of benzene per 100 gallons of 190 proof ethyl alcohol), acetone or water. However, such copolymers are soluble in mixtures of ethyl alcohol and water or Me₂CO and water. They are similarly soluble in methylene chloride.

The homopolymers of the acrylates and methacrylates of 3-(2-hydroxyethyl)-5-methyl-2-oxazolidinone have solubilities similar to those of the novel N-vinyl-5-methyl-2-oxazolidinone-containing copolymers of the present invention as set forth immediately above.

When wet, it was observed that the homopolymer of 3-(2-hydroxyethyl)-5-methyl-2-oxazolidinone acrylate is is elastomeric. Likewise, copolymers composed of from 10 to about 50 weight percent of 3-(2-hydroxyethyl)-5-methyl-2-oxazolidinone acrylate with the remainder of said copolymer being composed of N-vinyl-5-methyl-2-oxazolidinone are elastomeric when wet. The homopolymers of 3-(2-hydroxyalkyl)oxazolidinone methacrylates of the invention were observed to possess more rigidity than their acrylate homopolymer counterpart.

Of noteworthy significance is the finding that all of the new copolymeric and homopolymeric materials of the invention have the beneficial property of adhering tenaciously to smooth glass and/or metal substrates when such copolymeric and homopolymeric materials are wetted with a suitable solvent within the teachings disclosed above, coated on the surface of said substrates, and dried.

Further, the novel copolymers of copolymerized butyl acrylate and copolymerized 3-(2-hydroxyalkyl)oxazolidinone acrylates were found to be rubbery materials which were shown to be soluble in methylene chloride or toluene.

In view of the above, it will be seen that the several objects of the present invention are achieved and other advantageous results attained.

As many changes could be made in the above products without departing from the scope of the invention, it is intended that all matter contained in the above description shall be interpreted as illustrative and not in a limiting sense.

What is claimed is:
1. A polymer of 3-(2-hydroxyethyl)-5-methyl-2-oxazolidinone acrylate.
2. A homopolymer of 3-(2-hydroxyethyl)-5-methyl-2-oxazolidinone acrylate
3. A polymer of 3-(2-hydroxyethyl)-5-methyl-2-oxazolidinone methacrylate.
4. A homopolymer of 3-(2-hydroxyethyl)-5-methyl-2-oxazolidinone methacrylate.
5. A polymer of 3-(2-hydroxypropyl)-5-methyl-2-oxazolidinone methacrylate.
6. A homopolymer of 3-(2-hydroxypropyl)-5-methyl-2-oxazolidinone methacrylate.
7. A copolymer in percent by weight of from about 10 to about 50 percent of copolymerized 3-(2-hydroxyethyl)-5-methyl-2-oxazolidinone acrylate and from about 50 to about 90 percent of copolymerized N-vinyl-5-methyl-2-oxazolidinone.
8. A copolymer in percent by weight of from about 25 percent of copolymerized 3-(2-hydroxyethyl)-5-methyl-2-oxazolidinone methacrylate and about 75 percent of copolymerized N-vinyl-5-methyl-2-oxazolidinone.
9. A copolymer in percent by weight of from about 80 percent of copolymerized butyl acrylate and about 20 percent of copolymerized 3-(2-hydroxyethyl)-5-methyl-2-oxazolidinone acrylate.
10. A copolymer in percent by weight of from about 80 percent of copolymerized vinylidene chloride and about 20 percent of copolymerized 3-(2-hydroxyethyl)-5-methyl-2-oxazolidinone acrylate.
11. A copolymer in percent by weight of about 50 percent of copolymerized N-vinyl-2-pyrolidone and about 50 percent of copolymerized 3-(2-hydroxyethyl)-5-methyl-2-oxazolidinone acrylate.
12. A copolymer in percent by weight of about 50 percent of copolymerized vinyl acetate and about 50 percent of copolymerized 3-(2-hydroxyethyl)-5-methyl-2-oxazolidinone arcylate.
13. A copolymer in percent by weight of about 90 percent of copolymerized acrylamide and about 10 percent of copolymerized 3-(2-hydroxyethyl)-5-methyl-2-oxazolidinone acrylate.
14. A ternary polymer in percent by weight of about 65 percent of copolymerized lauryl methacrylate, about 20 percent of copolymerized hexyl methacrylate, and about 15 percent of copolymerized 3-(2-hydroxyethyl)-5-methyl-2-oxazolidinone methacrylate.

No references cited.

JOSEPH L. SCHOFER, *Primary Examiner.*

W. HOOVER, *Assistant Examiner.*

---

[1] A light grade of lubricating oil secured by distillation and generally prepared without chemical treatment by acid or alkali, but refined by simple filtration.